Nov. 10, 1970 S. S. GUTERMAN ET AL 3,540,016

MAGNETIC STORAGE INTEGRATED CIRCUIT FOR PERFORMING LOGICAL FUNCTIONS

Filed Nov. 9, 1965 7 Sheets-Sheet 1

INVENTORS
Sadia S. Guterman
BY & Robert D. Kodis
Morse, Altman & Oates
ATTORNEYS INVENTORS
Sadia S. Guterman
BY & Robert D. Kodis
Morse, Altman & Oates
ATTORNEYS INVENTORS
Sadia S. Guterman
BY & Robert D. Kodis
Morse, Altman & Oates
ATTORNEYS INVENTORS
Sadia S. Guterman
BY & Robert D. Kodis
Morse, Altman & Oates
ATTORNEYS INVENTORS
Sadia S. Guterman
BY & Robert D. Kodis
Morse, Altman & Oates
ATTORNEYS

| | | | |
|---|---|---|---|
| | 0 | 0 | 0 |
| 218 | 1 | 0 | 0 |
| 220 | 0 | 1 | 0 |
| 222 | 1 | 1 | 0 |
| 224 | 0 | 0 | 1 |
| 226 | 1 | 0 | 1 |
| 228 | 0 | 1 | 1 |
| 230 | 1 | 1 | 1 |
| 232 | 0 | 0 | 0 |

INVENTORS
Sadia S. Guterman
BY & Robert D. Kodis
Morse, Altman & Oates
ATTORNEYS INVENTORS
Sadia S. Guterman
BY & Robert D. Kodis
Morse, Altman & Oates
ATTORNEYS United States Patent Office 3,540,016

Patented Nov. 10, 1970

3,540,016
MAGNETIC STORAGE INTEGRATED CIRCUIT FOR PERFORMING LOGICAL FUNCTIONS

Sadia S. Guterman, Jamaica Plain, and Robert D. Kodis, Brookline, Mass., assignors to Di/An Controls, Inc., Boston, Mass., a corporation of Massachusetts Filed Nov. 9, 1965, Ser. No. 507,080
Int. Cl. G11c 7/00; H01l 19/00; H03k 19/08
U.S. Cl. 340—174 9 Claims

ABSTRACT OF THE DISCLOSURE

An integrated device comprises a single magnetic core, at most two windings and a logic circuit, all encapsulated as a unit. The logic circuit serves to enable the performance of all of the usual functions of the magnetic core notwithstanding the small number of windings.

The present invention relates to integrated circuitry and, more particularly, to an integrated circuit incorporating a nonvolatile data storage element.

In the past, an integrated circuit for data storage typically incorporated a solid state flip-flop in the form of a pair of cross coupled transistors. A disadvantage of such a circuit is its volatility, i.e. its consumption of standby power without which it would cease to retain data stored therein. It is recognized that a magnetic core with a square hysteresis loop is nonvolatile, i.e. need not consume standby power as it retains stored data. Generally, however, substitution of a magnetic core for a solid state flip-flop in order to provide nonvolatile data storage in an integrated circuit has not been feasible because of difficulties in isolating the inductive operation of magnetic cores and in and in transferring high peak power at high frequency to magnetic cores.

The object of the present invention is the provision of an integrated circuit unit for, nonvolatile data storage, characterized by a novel association of (1) a single magnetic storage element, which is effectively isolated from other related magnetic storage elements, (2) a logic circuit, through which data is written into and read from the magnetic storage element, and (3) at most two windings inductively coupled to the magnetic storage element and conductively coupled to the logic circuit, as the only paths for communicating with the magnetic storage element. At the low power levels contemplated in integrated circuitry, the foregoing arrangement eliminates problems of failing to meet the relatively complex and physically difficult interconnection requirements of a core-to-core system by substituting the relatively simple and less stringent interconnection requirements of a circuit-to-circuit system. The magnetic storage element and the associated logic circuit are integrated physically by miniaturization and encapsulation.

Other objects of the present invention will in part be obvious and will in part appear hereinafter.

For a fuller understanding of the nature and objects of the present invention reference should be had to the following detailed description, taken in connection with the accompanying drawings, wherein.

THE INTEGRATED CIRCUIT OF FIG. 1

Figure 1:
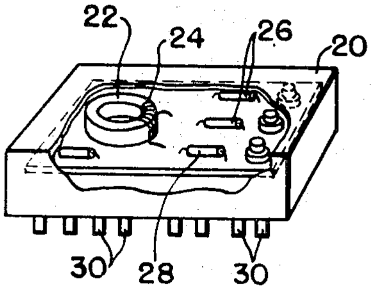
FIG. 1 is a perspective mechanical view of an integrated circuit structure embodying the present invention.

The integrated circuit structure of FIG. 1 is shown as comprising an encapsulating matrix 20 of parallelepiped shape. Within this matrix are: a single magnetic core 22 of square hysteresis loop material; a single transducing winding 24; and circuit components shown generally at 26 to be described in detail below. The circuit components are supported on a plastic wafer 28 and are electrically connected to operate via eight terminals 30 protruding from the matrix. Circuit components 26 provide: a logic control as shown in FIG. 2 for controlling the state of core 22; and a logic input as shown in FIG. 3 for routing input pulses to the logic control.

THE SCHEMATIC DIAGRAM OF FIG. 2

Figure 2:
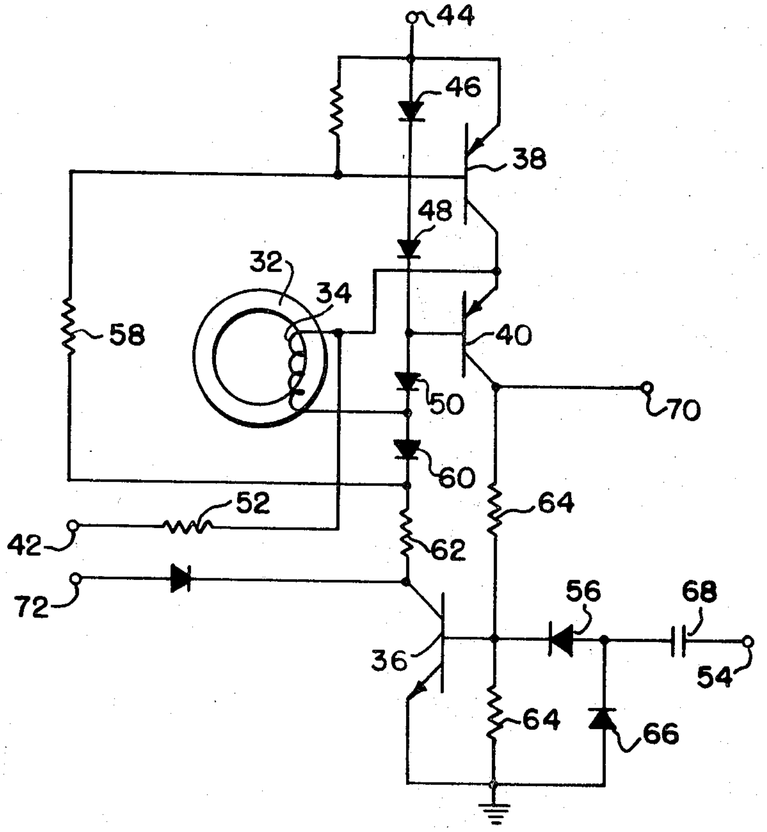
FIG. 2 is an electrical schematic of a circuit of the structure of FIG. 1.
Figure 3:
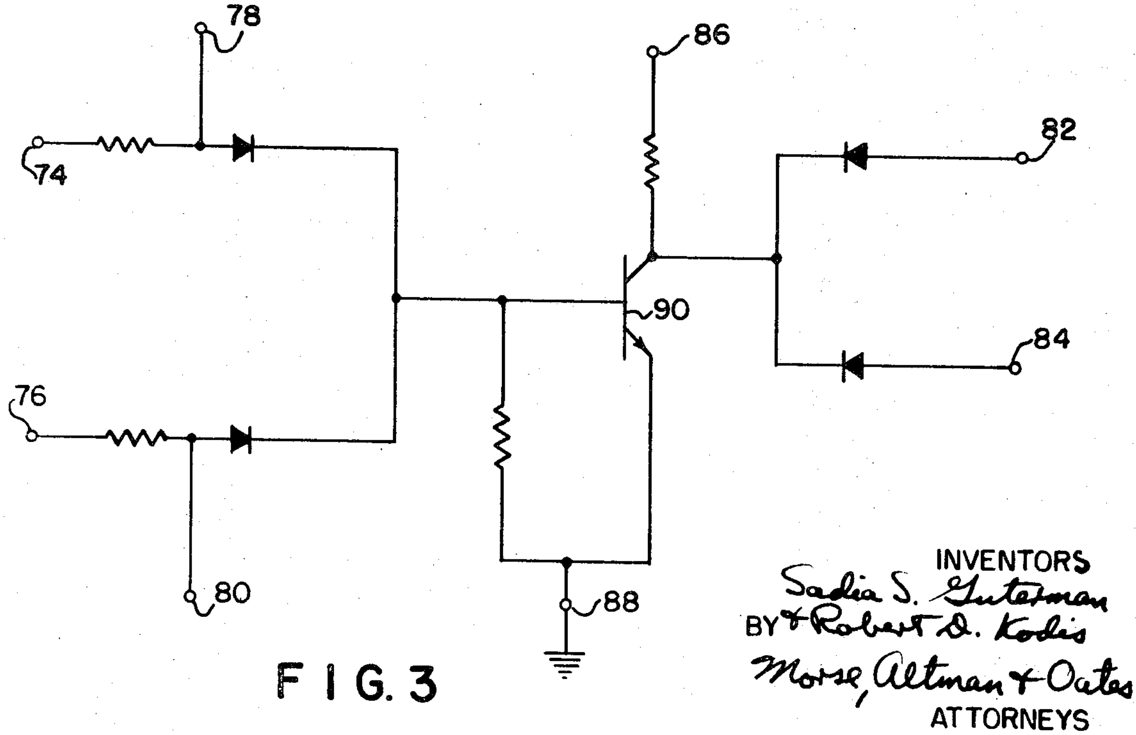
FIG. 3 is an electrical schematic of another circuit of the structure of FIG. 1.

FIG. 2 is an electrical schematic of certain components of FIG. 1, showing core 22 at 32, showing winding 24 at 34 and showing certain circuit components 26, as constituting the logic control, as including three switching transistors 36, 38, 40. This circuit is such that on applying a negative going pulse from the DC voltage supply through a load input terminal 42, a ONE is written into the core. Current flows from positive voltage supply 44 through three diodes 46, 48, 50, through single transducing winding 34 and through a resistor 52 to ground. To read out the stored ONE, a positive DC voltage pulse from ground is applied to a trigger input terminal 54. The rise time of this pulse is AC coupled through a diode 56 to the base of transistor 36 causing the transistor to conduct and to draw current through a resistor 58 and the base of transistor 38. A current path then is established through transistor 38, single transducing winding 34, a diode 60, a resistor 62 and transistor 36. Since the direction of the current now is opposed to that of the loading current and a ONE is stored in the core, a voltage is induced because of the switching of winding 34 to cause the emitter and base of transistor 40 to be forward biased. Transistor 40 now conducts so that current flows through a resistor 64 and into the base of transistor 36 thereby establishing a regenerative loop including transistors 40 and 36. Transistor 40 continues to conduct until core 32 has been fully switched and the induced voltage has fallen below the base-emitter voltage threshold of transistor 40. When transistor 40 has stopped conducting, transistors 36 and 38 become nonconducting.

If core 32 initially is in the ZERO state, a pulse at terminal 54 causes transistors 36 and 38 to conduct but the induced voltage across winding 34 is not great enough to cause transistor 40 to conduct. Diode 50 serves to increase the voltage threshold of transistor 40 in order to prevent it from falsely conducting during read-out of a ZERO. Following the end of the trigger pulse, a diode 66 provides a discharge path for a coupling capacitor 68. A typical input pulse is 0.5 microsecond wide and has a rise time of 0.2 microsecond to maximum. Diodes 46 and 48 serve to prevent current diversion from transistor 38 and winding 34 during readout. The base of transistor 40 being clamped by the saturation of transistor 38, the base-emitter voltage of transistor 40 is low enough not to permit passage of current through diodes 46 and 48. Resistor 58 is connected to the junction between diode 60 and resistor 62, rather than to the collector of transistor 36, in order to decrease the storage time of transistor 36 during read out. Diode 60 prevents transistor 38 from conducting during load time. A pair of output terminals at 70 and 72 serve to read out the state of the core.

THE SCHEMATIC DIAGRAM OF FIG. 3

The logic input, as shown in FIG. 3, contributes to the elimination of relatively numerous windings of prior magnetic core circuits by performing pre-storage logic. The components of this eight terminal circuit, in association with a single transistor 90, include an input means including a pair of input terminals 74, 76, an inhibit means including two inhibit terminals 78, 80, an output means including two output terminals 82, 84, a power supply terminal 86 for low voltage, a reference terminal 88 for a reference voltage 88. A pulse into either of inputs 74, 76 is applied to the base of transistor 90 to cause conduction. A current path then is established from low power supply terminal 86 to ground to provide an output across terminals 82, 84. These output terminals are connected to input terminals 42 of the logic control of FIG. 2 in order to write into the core. Terminal 54 is used in the logic system of FIG. 14, as will become apparent below. The output pulse of the circuit of FIG. 3 can be inhibited by connection of the output terminals of a second such circuit to inhibit terminals 78 and 80.

THE SYSTEMS OF FIGS. 4 TO 14

Figure 4:
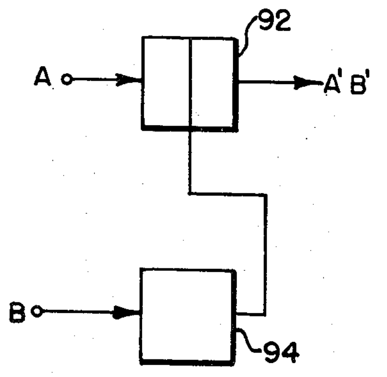
FIG. 4 is a symbolic diagram of a logic system embodying the present invention.
Figure 5:
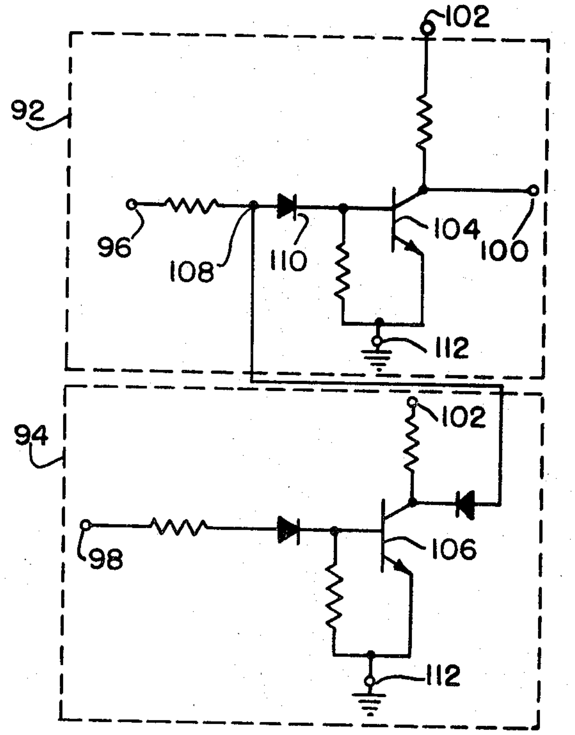
FIG. 5 is an electrical schematic of the system of FIG. 4.

The system of FIGS. 4 and 5 illustrates the interconnection of two logic input gates 92, 94 capable of writing information through a logic control gate of FIG. 2 into the core of FIG. 1. as shown in FIG. 4, second logic input 94 can inhibit first logic input 92 so that the function $A \cdot B'$ can be achieved. As shown in FIG. 5, two interconnected gates, each like that of FIG. 3, are provided. These gates have a pair of input terminals 96, 98, one output terminal 100, a voltage supply terminal 102, two transistors 104, 106 and one inhibit terminal 108. Input terminal 96 is coupled through a diode 110 to the base of transistor 104, which is energized when a pulse is applied to terminal 96. A current path is established from voltage supply terminal 102 through transistor 104 to ground as at 112, thereby applying a signal at output terminal 100. If, however, a pulse is applied at input terminal 98, inhibit terminal 108 permits no output signal at output terminal 100.

Figure 7:
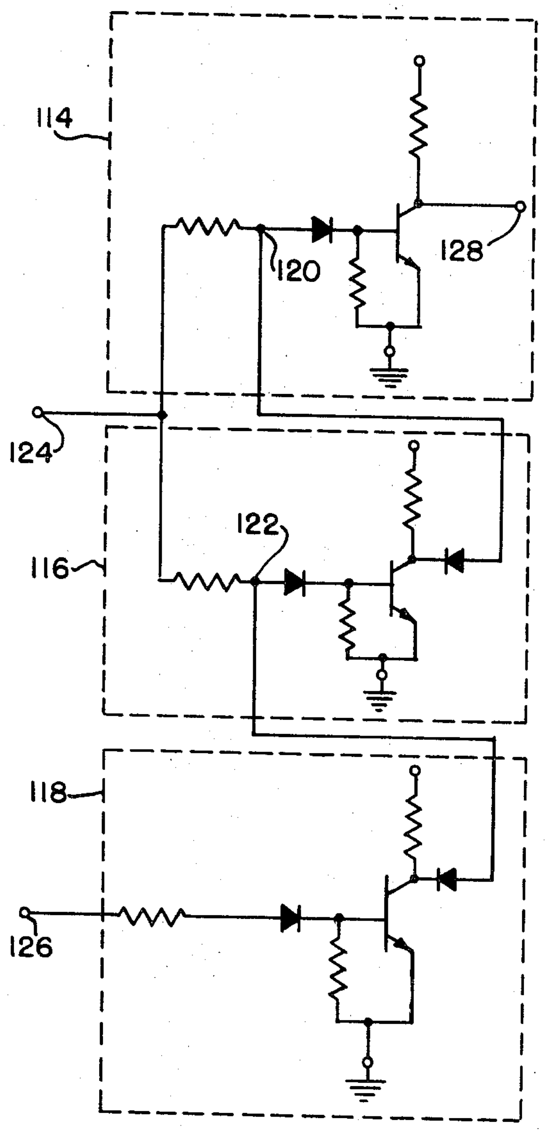
FIG. 7 is an electrical schematic of the system of FIG. 6.
Figure 6:
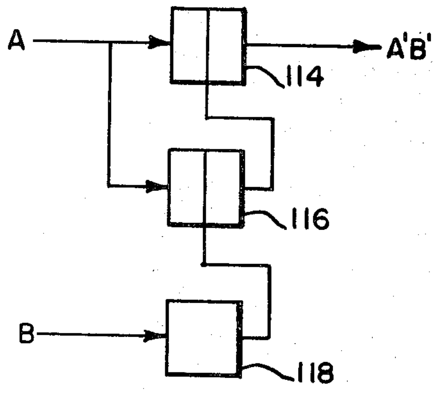
FIG. 6 is a symbolic diagram of another logic system embodying the present invention.

FIGS. 6 and 7 show connections for an AND system involving three interconnecting gates 114, 116, 118. FIG. 7 shows this system as comprising a combination of three gates, each like that shown in FIG. 3. By interconnecting the output terminals of two of these gates to the inhibit terminal of the adjacent gate as at 120, 122, an input pulse at terminals 124, 126 generates an AND output pulse at terminal 128.

Figures 8, 9:
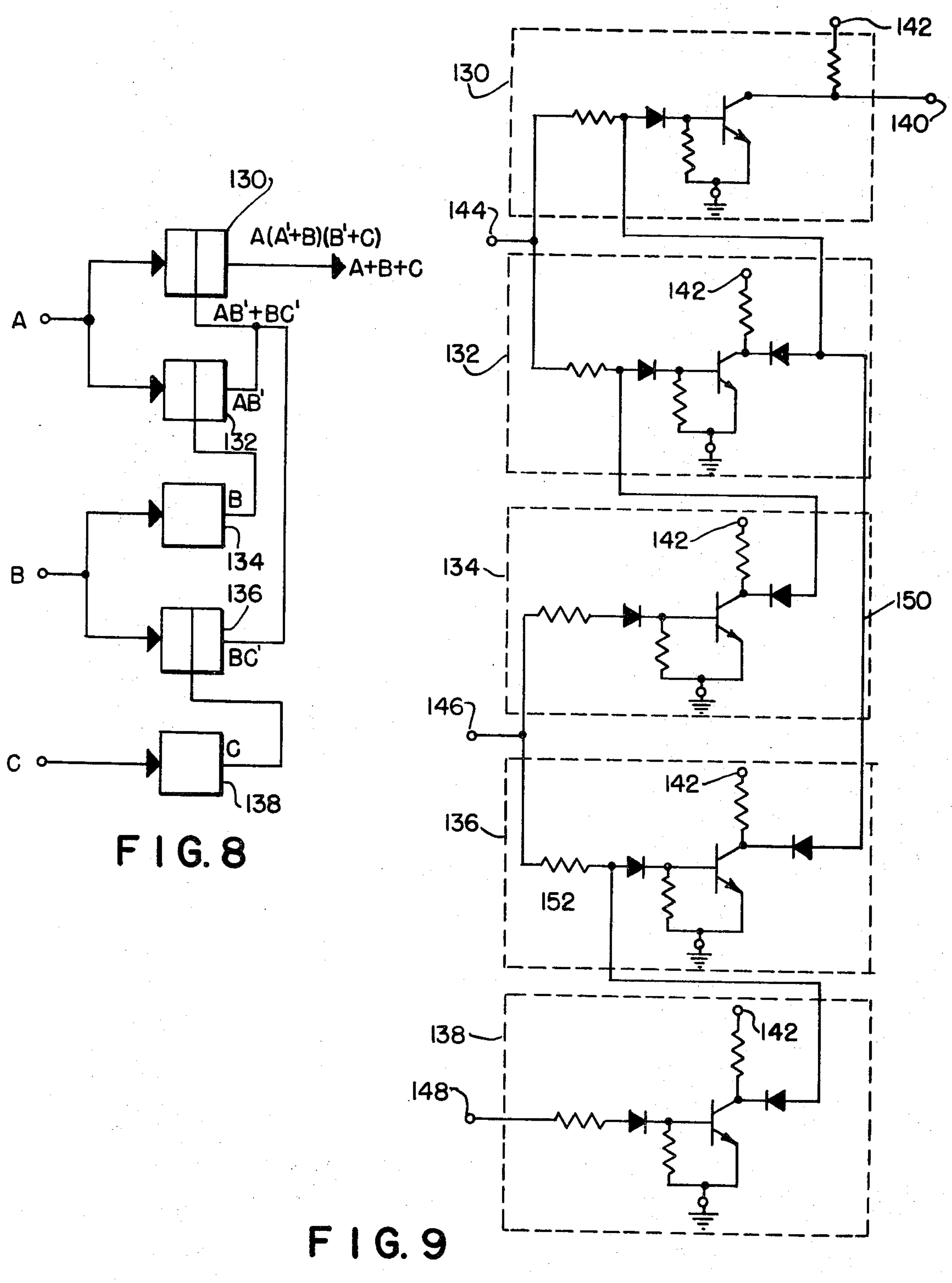
FIG. 8 is a symbolic diagram of another logic system embodying the present invention.
FIG. 9 is an electrical schematic of the system of FIG. 8.

The system of FIGS. 8 and 9 include five interconnecting gates 130, 132, 134, 136 and 138, representing the AND function. Each gate is like that shown in FIG. 3. The output terminal is shown at 140 and a power supply terminal is shown at 142. First and second gates 130, 132 have a common input terminal 144. Third and fourth gates 134, 136 have a common input terminal 146. Fifth gate 138 has a singular input terminal 148. The output terminals of second and fourth gates 132, 136 are interconnected at 150 to enable inhibiting of the signal from input terminal 144 of first gate 130. Fifth gate output terminal 152 is connected to enable application of an inhibit signal from input terminal 146.

Figures 10, 11:
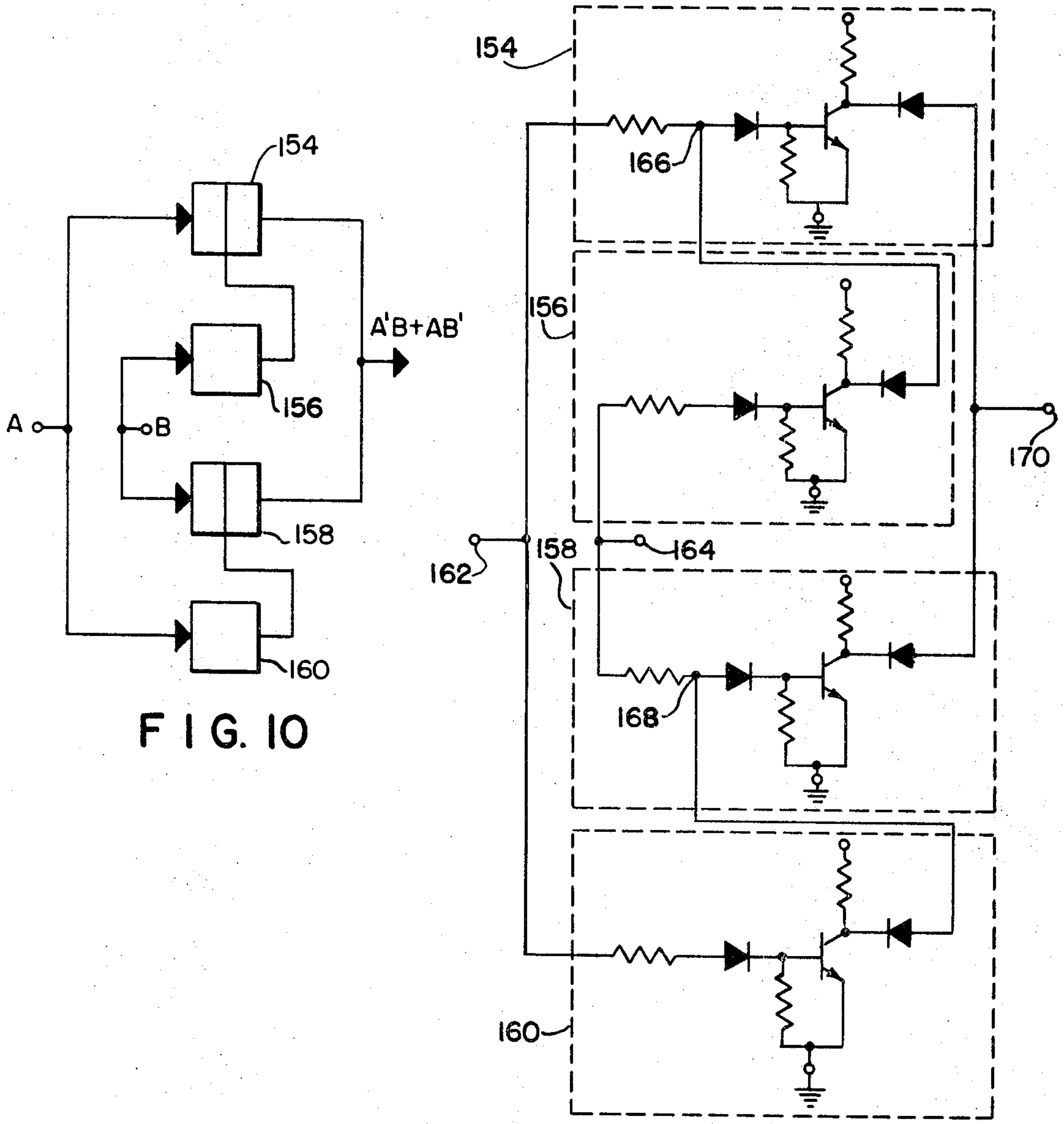
FIG. 10 is a symbolic diagram of another system embodying the present invention.
FIG. 11 is an electrical schematic of the system of FIG. 10.

An exclusive OR logic system is shown in FIGS. 10 and 11 as having interconnecting gates 154, 156, 158, 160. If a pulse A is applied to first and fourth gates 154, 160 and a pulse B is applied to second and third gates 156, 158, the output will represent $A'B+AB'$. In FIG. 11, the four interconnecting gates 154, 156, 158 and 160 are shown as being like that shown in FIG. 3. There are two inputs 162, 164, one of which is connected to first and fourth terminal gates 154, 160 and the other of which is connected to second and third gates 156, 158. First gate 154 can be inhibited by the output 166 of second gate 156 and third gate 158 can be inhibited by the output 168 of fourth gate 160. The outputs of first and third gates 154, 158 are coupled at output terminal 170. If a pulse is applied to terminal 162 or terminal 164, there is generated an output pulse 154 or 158 at terminal 170. A pulse at input terminal 162 generates an output pulse through first gate 154 and a pulse at input terminal 164 generates an output pulse through third gate 158. A pulse at input terminals 162 and 164 permits no output pulse because first and third gates 154, 158 are inhibited by second gate 156 at terminal 166 and by fourth gate 160 at terminal 168.

Figures 12, 13:
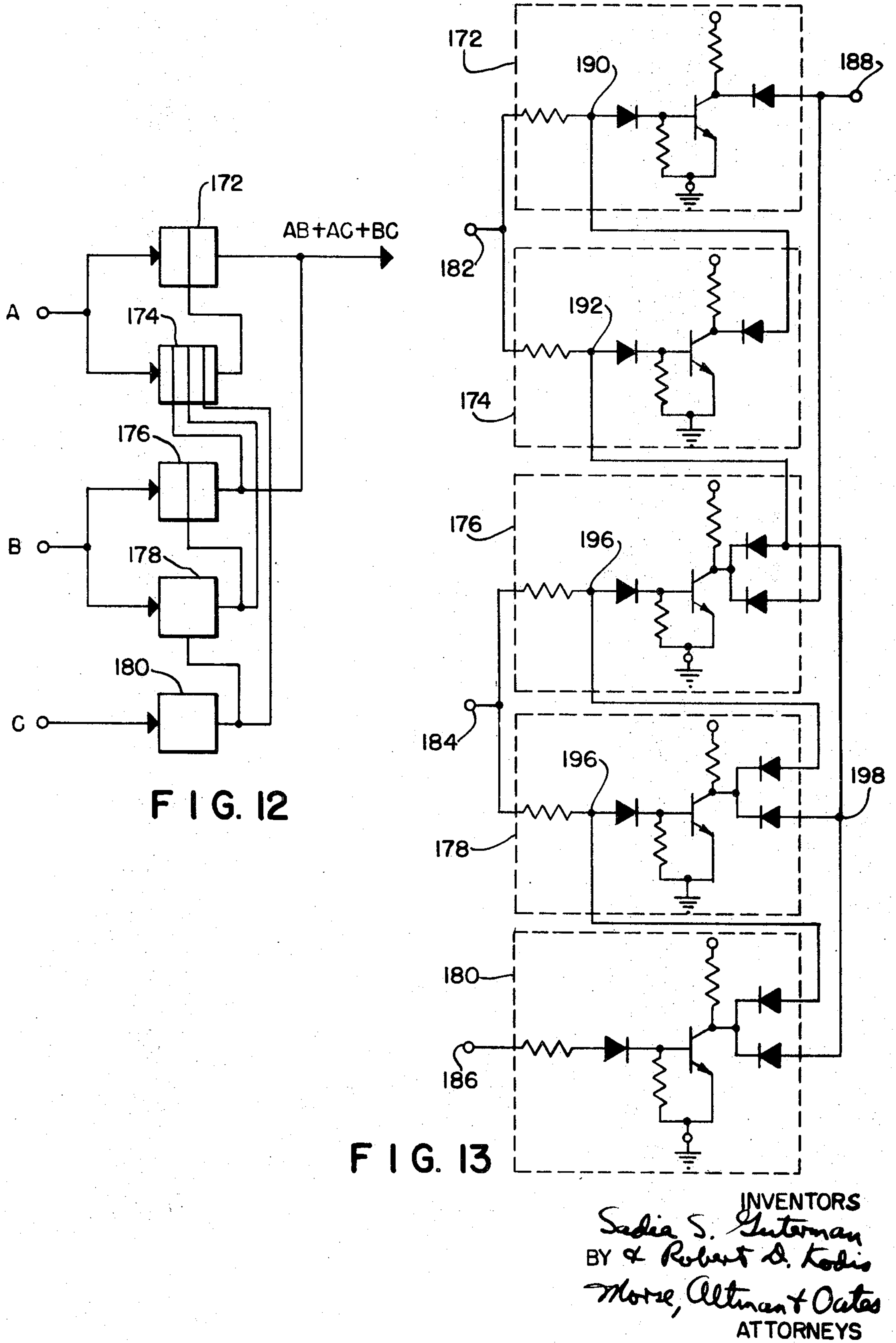
FIG. 12 is a symbolic diagram of another system embodying the present invention.
FIG. 13 is an electrical schematic of the system of FIG. 12.

FIGS. 12 and 13 illustrate a two-out-of-three majority logic system comprising five interconnected gates 172, 174, 176, 178 and 180, each like the gate of FIG. 3. By way of example, if a signal A is applied to the first input terminal and a signal B is applied to the second terminal, the output represents A and B and NOT C. If a signal C also is applied the output is inhibited. Similarly, an input signal A and an input signal C, without an input signal B, generate an output. In FIG. 13, the three input terminals are shown at 182, 184, 186. First input terminal 182 is coupled to first and second interconnecting gates 172, 174. Second terminal 184 is coupled to third and fourth interconnecting gates 176, 178. Third input terminal 186 is coupled to fifth gate 180. First gate 172 and third gate 176 have a common output terminal 188. The output terminal of the second gate 174 is connected to enable an inhibit of first gate 172 at 190. The output of third gate 176 is connected to enable an inhibit of second gate 174 at 192. The output of fourth gate 178 is applied at 194, 192 to enable an inhibit of third gate 176 and second gate 174. The output of fifth gate 180 is applied at 196 to enable an inhibit of fourth gate 178 and is coupled to the output of third and fourth gates 176, 178 at 198 as well as to the inhibit terminal of second gate 174.

Figures 14, 15:
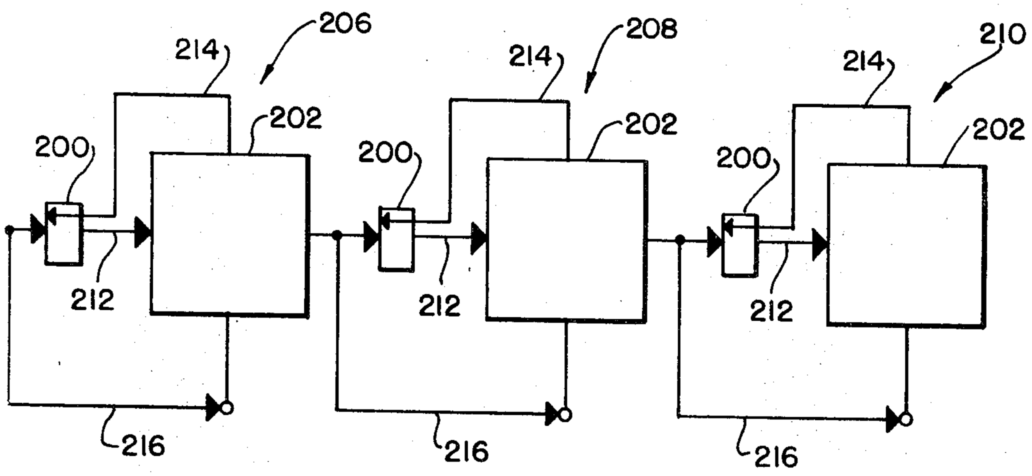
FIG. 14 is a symbolic diagram of another logic system embodying the present invention.
FIG. 15 is a chart illustrating the operation of the system of FIG. 14.

The system of FIG. 14 constitutes a binary counter incorporating three units 206, 208, 210 of the type shown in FIG. 1. Each includes a logic input gate 200 and a logic control gate 202. The output terminal of each screen gate is shown at 212, as is also its connection to the input terminal of the next adjacent integrated circuit unit. The inverted output 72 of each logic control gate is shown at 214 as being applied to inhibit each logic input gate in such a way as to prevent an input until the information in each gate has been read out. The table of FIG. 15 shows the state of each unit after the application of a pulse. Thus after the first pulse, the state of each unit is as shown in row 218, after the second pulse the state of each unit is as shown in row 220, and after the succeeding pulses, the states of each unit are as shown respectively in rows 222, 224, 226, 228, 230 and 232.

THE SCHEMATIC DIAGRAM OF FIG. 16

Figure 16:
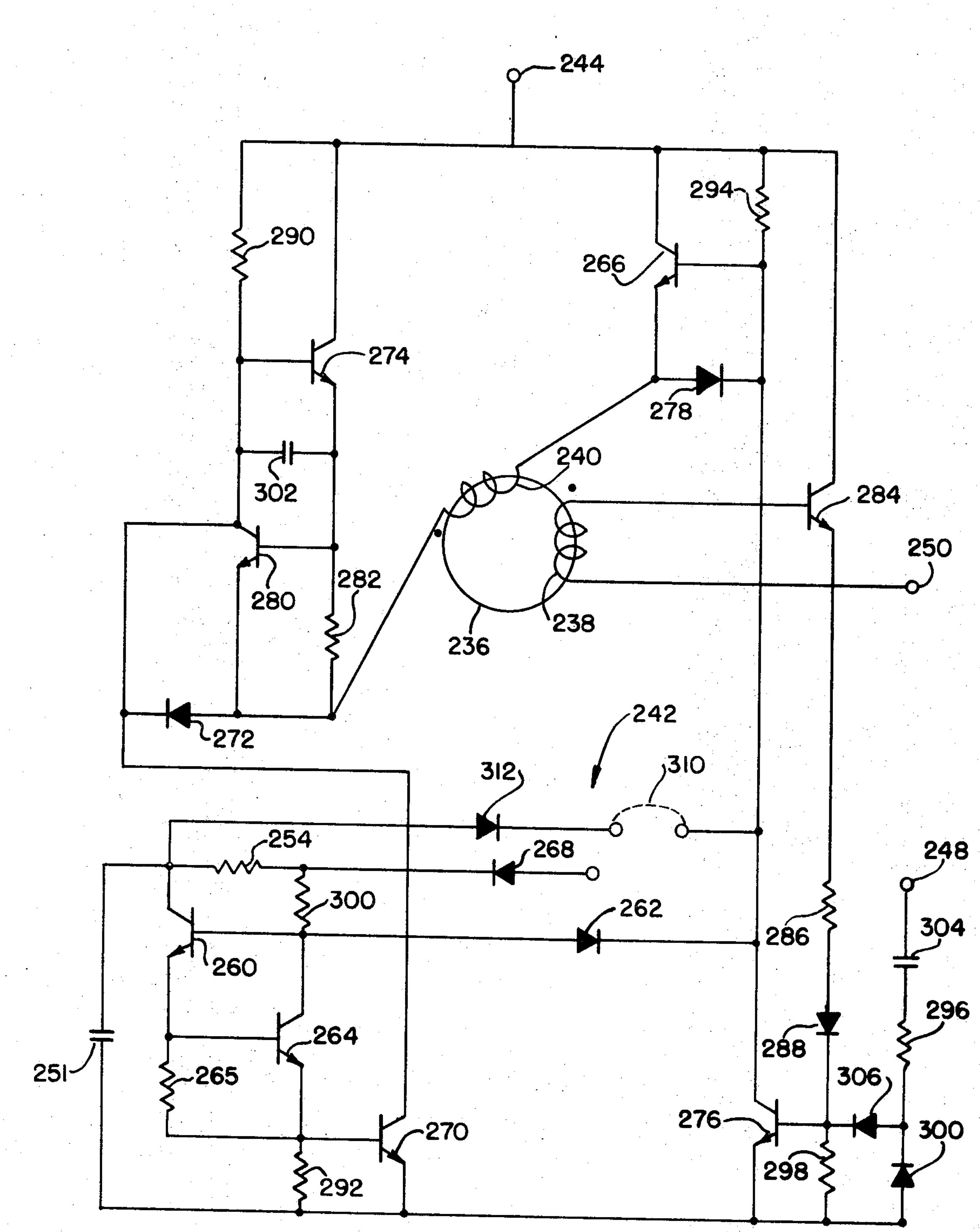
FIG. 16 is an electrical schematic of another structure, analogous to that of FIG. 1, embodying the present invention.

FIG. 16 is a schematic diagram of an integrated circuit structure, analogous to that of FIG. 1, comprising a core 236, a pair of windings 238, 240, 20 and 40 turns respectively, and a logic circuit to be described generally shown at 242. The components of the logic circuit are energized by a power supply terminal 244 and serve as a load input means energized by a load input terminal 246 for writing into the core, a trigger input means having a trigger input terminal 248 for reading out the core, an inhibit means having an inhibit terminal 310 for precluding change in the core, and an output means having an output terminal 250 through which an indicating signal is available.

Applying a positive going pulse from ground, typically having a 4.5 volt height and a 1 microsecond width, to load input terminal 246 writes a ONE into the core. The load input pulse fully charges a capacitor 251 through a diode 268 and a resistor 254. After completion of the load input pulse, capacitor 251 discharges causing a transistor 270 to conduct. While charging capacitor 251, the current is limited by resistor 254. A transistor 260 is nonconducting if its base is shunted to ground by a diode 262. The combination of transistor 260, a transistor 264 and a resistor 265 limits the discharge current of capacitor 251 and provides current to the base of a transistor 270 that has very little variation with power supply. Typically it limits current to approximately 0.4 ma. until the voltage across capacitor 251 drops to about 1.5 volts, then it decreases. Transistor 270 continues a current path established through the core winding via a transistor 266, a diode 272 and a transistor 270 in the core loading direction. The drop across a diode 272 prevents a transistor 274 from conducting.

To read out the core, a positive going pulse from ground, typically 4.5 volts in height, 0.5 microsecond in width and with a rise time of 0.2 microsecond maximum, is applied to trigger input terminal 248. This pulse during its rise time is AC coupled to the base of a transistor 276 causing the transistor to conduct. A current path now is established through transistor 276, a diode 278, winding 240, transistor 274 and a resistor 282. The regulating function of transistor 274, transistor 280 and resistor 282 limits the read out current to a value predetermined by 290 and varies very little with power supply fluctuations. If a ONE is stored in the core, a voltage is induced when the core is switched, in winding 238, causing a transistor 284 to be forward biased from emitter to base. Transistor 284 now conducts causing current to flow through a resistor 286, a diode 288 and into the base of transistor 276 to establish a regenerative loop including transistors 276, 284. Transistor 284 continues to conduct until the core is fully switched and the induced voltage falls below the voltage threshold from base to emitter of transistor 284. When transistor 284 stops conducting, transistor 276 becomes non-conducting.

If the core initially is in the ZERO state, an input pulse at trigger terminal 248 causes transistor 276 to conduct. However the resulting induced voltage across winding 240 is not great enough to cause transistor 284 to conduct. The regulating action of transistors 274, 280 limits the current and prevents false outputs in the event of fluctuations of the power supply. As a result, there is a positive voltage output at the emitter of transistor 284 only if the core initially is in the ONE state. During the core read out, transistor 276 is conducting, driving its collector to ground and dropping the voltage level of the base of transistor 276 by current flow through diode 262. Thus base current to transistor 270 is cut off, preventing load current from occurring at the same time as read out current. In the circuit of FIG. 16 also are suitable biasing resistors 290, 294, 296, 298, 300, bypass and coupling capacitors 302, 304 and bypass and coupling diodes 306.

SYSTEMS INCORPORATING THE INTEGRATED CIRCUIT OF FIG. 16

In a binary counter system incorporating a series of integrated units of the type shown in FIG. 16, the trigger and load input terminals of one unit are joined and connected to the output terminal of the preceding unit. The inhibit operation is performed as at 310 through a diode 312 between the collectors of transistors 260 and 276 in such a way as to prevent charging from the preceding stage.

CONCLUSION

The foregoing disclosure exemplifies the physical form (FIG. 1) of an illustrative integrated product, the circuit configurations (FIGS. 2, 3 and 16) of illustrative integrated circuits and various relationships (FIGS. 4 to 15) in illustrative integrated systems, all in accordance with the present invention. In one form any system of the type shown in FIGS. 4 to 15 is supported and encapsulated in the manner illustrated in FIG. 1. Since certain changes may be made in the foregoing specification and in the accompanying drawings without departing from the scope of the present invention, it is intended that all matter appearing in the present disclosure be interpreted in an illustrative and not in a limiting sense.

What is claimed is:

1. An integrated circuit unit comprising, as components only a single magnetic storage element, at most two winding means, a logic circuit for causing said winding means to switch said magnetic storage element between two stable magnetic states, and terminal means, said logic circuit including first means for applying a pulse from said terminal means to said winding means in order to apply a first magnetic field to said magnetic storage element, second means for applying a pulse from said terminal means to said winding means in order to apply a second magnetic field to said magnetic storage element, and third means for applying a pulse from said terminal means to said winding means in order to apply a third magnetic field to said magnetic storage element, said first magnetic field tending to switch said magnetic storage element between two stable magnetic states, said second magnetic field tending to switch said magnetic storage element between said two stable magnetic states, said third means and one of said first and second means being synchronously operable to apply mutual inhibitory pulses to said winding means in order to preclude switching of said magnetic storage element between said two stable magnetic states, all of said components being encapsulated in a single matrix said unit being self-contained and being capable of communication externally of said unit only through said terminal means.

2. The integrated circuit of claim 1 wherein said winding means is constituted by a pair of windings.

3. The integrated circuit unit of claim 1 wherein said magnetic storage element is a single core, said winding means is a pair of windings inductively coupled to said core, said first means includes a first transistor subcircuit, said second means includes a second transistor subcircuit and said third means includes a third transistor subcircuit.

4. An integrated circuit system comprising a sequence of interacting integrated circuit units, each of said integrated circuit units comprising only a single magnetic storage element, at most two winding means, and a logic circuit for causing said winding means to switch said magnetic storage element between two stable magnetic states, and terminal means said logic circuit including first means for applying a pulse from said terminal means to said winding means in order to apply a first magnetic field to said magnetic storage element, second means for applying a pulse to said winding means from said terminal means in order to apply a second magnetic field to said magnetic storage element, and third means for applying a pulse to said winding means from said terminal means in order to apply a third magnetic field to said magnetic storage element, said magnetic storage element, said winding means and said logic circuit being encapsulated in a single matrix, said first magnetic field tending to switch said magnetic storage element between two stable magnetic states, said second magnetic field tending to switch said magnetic storage element between said two stable magnetic states, said third means and one of said first and second means being synchronously operable to apply mutually inhibitory pulses to said winding means in order to preclude switching of said magnetic storage element between said two stable magnetic states, said unit being self-contained and being capable of communication externally of said unit only through said terminal means.

5. The integrated circuit system of claim 4 wherein said winding means is constituted by a pair of windings.

6. An integrated circuit unit comprising, as components, a magnetic storage element, at most two winding means, and a logic circuit for causing said winding means to switch said magnetic storage element between two stable magnetic states, said logic circuit including first means for applying a pulse to said winding means in order to apply a first magnetic field to said magnetic storage element, second means for applying a pulse to said winding means in order to supply a second magnetic field to said magnetic storage element, and third means for applying a pulse to said winding means in order to apply a third magnetic field to said magnetic storage element, said first magnetic field tending to switch said magnetic storage element between two stable magnetic states, said second magnetic field tending to switch said magnetic storage element between said two stable magnetic states, said third means and one of said first and second means being synchronously operable to apply mutually inhibitory pulses to said winding means in order to preclude switching of said magnetic storage element between said two stable magnetic states, all of said components being encapsulated in a single matrix, said winding means being constituted by a single winding.

7. An integrated circuit system comprising a sequence of interacting integrated circuit units, each of said integrated circuit units comprising a magnetic storage element, at most two winding means, and a logic circuit for causing said winding means to switch said magnetic storage element between two stable magnetic states, said logic circuit including first means for applying a pulse to said winding means in order to apply a first magnetic field to said winding means in order to apply a first magnetic field to said magnetic storage element, second means for applying a pulse to said winding means in order to apply a second magnetic field to said magnetic storage element, and third means for applying a pulse to said winding means in order to apply a third magnetic field to said magnetic storage element, said magnetic storage element, said winding means and said logic circuit being encapsulated in a single matrix, said first magnetic field tending to switch said magnetic storage element between two stable magnetic states, said second magnetic field tending to switch said magnetic storage element between said two stable magnetic states, said third means and one of said first and second means being synchronously operable to apply mutually inhibitory pulses to said winding means in order to preclude switching of said magnitude storage element between said two stable magnetic states, said winding means being constituted by a single winding.

8. An integrated circuit unit comprising, as components, a magnetic storage element, at most two winding means, and a logic circuit for causing said winding means to switch said magnetic storage element between two stable magnetic states, said logic circuit including first means for applying a pulse to said winding means in order to apply a first magnetic field to said magnetic storage element, second means for applying a pulse to said winding means in order to apply a second magnetic field to said magnetic storage element, and third means for applying a pulse to said winding means in order to apply a third magnetic field to said magnetic storage element, said first magnetic field tending to switch said magnetic storage element between two stable magnetic states, said second magnetic field tending to switch said magnetic storage element between said two stable magnetic states, said third means and one of said first and second means being synchronously operable to apply mutually inhibitory pulses to said winding means in order to preclude switching of said magnetic storage element between said two stable magnetic states, all of said components being encapsulated in a single matrix, said magnetic storage element being a single core, said switching means being a single winding inductively coupled to said core, said first means including a first transistor, said second means including a second transistor and said third means including a third transistor.

9. The integrated circuit unit of claim 8 wherein said first transistor has a pair of first input-output terminals and a first control terminal, said second transistor has a pair of second input-output terminals and a second control terminal, said third transistor has a pair of third input-output terminals and a third control terminal, one of said first input-output terminals being connected to one of said second input-output terminals and to one of the terminals of said winding, the other of said first input-output terminals being connected through rectifying means to said second control terminal, said second control terminal being connected through rectifying means to the other of said terminals of said winding, said other of said terminals of said winding being connected through a serially connected rectifying means and a resistor means to one of said third input-output terminals, said first control terminal being connected through a resistor to said one of said first input-output terminals, and through a resistor to the junction between said serially connected rectifying means and resistor means, said other of said third input-output terminals being connected through a resistor to said third control means, signal input-output terminals being operatively connected to said logic circuit.

References Cited

UNITED STATES PATENTS

| | | | |
|---|---|---|---|
| 3,256,587 | 6/1966 | Hangstefer | 307—213 |
| 3,339,186 | 8/1967 | Cohen | 340—174 |
| 2,934,748 | 4/1960 | Steimen | 340—174 |
| 3,247,494 | 4/1966 | Ashley | 340—174 |
| 3,329,940 | 7/1967 | Barnes et al. | 340—174 |

STANLEY M. URYNOWICZ, Jr., Primary Examiner

U.S. Cl. X.R.

307—88, 213